United States Patent
Schmidt et al.

(10) Patent No.: US 11,838,451 B2
(45) Date of Patent: *Dec. 5, 2023

(54) REDUCTION OF STARTUP TIME IN REMOTE HLS

(71) Applicant: ARRIS Enterprises LLC, Suwanee, GA (US)

(72) Inventors: Mark S. Schmidt, San Diego, CA (US); William P. Franks, San Diego, CA (US); Paul Moroney, La Jolla, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/835,375

(22) Filed: Jun. 8, 2022

(65) Prior Publication Data

US 2022/0303602 A1    Sep. 22, 2022

Related U.S. Application Data

(63) Continuation of application No. 15/621,467, filed on Jun. 13, 2017, now Pat. No. 11,388,463.
(Continued)

(51) Int. Cl.
*H04N 21/2662* (2011.01)
*H04N 19/40* (2014.01)
*H04N 21/234* (2011.01)
*H04N 21/2343* (2011.01)
*H04N 21/433* (2011.01)
(Continued)

(52) U.S. Cl.
CPC ........ *H04N 21/2662* (2013.01); *H04N 19/40* (2014.11); *H04N 21/23406* (2013.01); *H04N 21/234345* (2013.01); *H04N 21/2402* (2013.01); *H04N 21/4333* (2013.01); *H04N 21/4384* (2013.01); *H04N 21/44029* (2013.01); *H04N 21/44227* (2013.01); *H04N 21/8456* (2013.01)

(58) Field of Classification Search
None
See application file for complete search history.

(56) References Cited

U.S. PATENT DOCUMENTS 9,288,510 B1 *  3/2016  Yang .............. H04N 21/234309
9,472,239 B1 * 10/2016  Martin ................. G11B 27/105
(Continued)

OTHER PUBLICATIONS

PCT International Search Report & Written Opinion, Re: Application No. PCT/US2017/037234, dated Aug. 1, 2017.
(Continued)

*Primary Examiner* — Ricky Chin
(74) *Attorney, Agent, or Firm* — Chernoff, Vilhauer, McClung & Stenzel, LLP

(57) ABSTRACT

A method is provided for streaming transcoded HLS video from a video asset to allow a minimum startup delay time. A method includes pre-transcoding a first number of the HLS chunks. Then, once a request is received from a remote HLS client for the HLS video asset, transmitting a number of the pre-transcoded chunks to the remote HLS player. The pre-transcoded chunks are transmitted during a startup period until real-time transcoded chunks can be received and processed by the remote HLS player at a time position to allow seamless transition from the pre-transcoded chunks.

14 Claims, 4 Drawing Sheets

Related U.S. Application Data

(60) Provisional application No. 62/349,623, filed on Jun. 13, 2016.

(51) Int. Cl.
  H04N 21/24 (2011.01)
  H04N 21/442 (2011.01)
  H04N 21/845 (2011.01)
  H04N 21/438 (2011.01)
  H04N 21/4402 (2011.01)

(56) References Cited

U.S. PATENT DOCUMENTS

| | | | |
|---|---|---|---|
| 9,648,395 B1* | 5/2017 | Henry | H04L 65/762 |
| 11,388,463 B2* | 7/2022 | Schmidt | H04N 21/4333 |
| 2004/0024896 A1* | 2/2004 | Stafford | H04L 69/16 |
| | | | 709/230 |
| 2011/0080940 A1* | 4/2011 | Bocharov | H04N 21/4348 |
| | | | 375/240.01 |
| 2012/0195362 A1* | 8/2012 | Benno | H04L 67/5682 |
| | | | 375/E7.026 |
| 2012/0265847 A1* | 10/2012 | Swenson | H04L 65/1076 |
| | | | 709/217 |
| 2013/0268961 A1* | 10/2013 | Miles | H04N 21/262 |
| | | | 725/32 |
| 2013/0326024 A1* | 12/2013 | Chen | H04L 65/65 |
| | | | 709/219 |
| 2014/0068096 A1* | 3/2014 | Shivadas | H04N 21/8456 |
| | | | 709/231 |
| 2014/0143439 A1* | 5/2014 | Ramamurthy | H04N 21/25808 |
| | | | 709/231 |
| 2014/0164482 A1* | 6/2014 | Losev | H04N 21/2187 |
| | | | 709/203 |
| 2014/0208374 A1* | 7/2014 | Delaunay | H04N 21/23439 |
| | | | 725/109 |
| 2014/0337903 A1* | 11/2014 | Zhu | H04N 21/2387 |
| | | | 725/90 |
| 2014/0380376 A1* | 12/2014 | Schmidt | H04N 21/4385 |
| | | | 725/54 |
| 2015/0032851 A1* | 1/2015 | Lieber | H04L 65/762 |
| | | | 709/219 |
| 2015/0089023 A1* | 3/2015 | Phillips | H04L 65/612 |
| | | | 709/219 |
| 2015/0156511 A1* | 6/2015 | Lundberg | H04N 19/44 |
| | | | 375/240.12 |
| 2015/0237090 A1* | 8/2015 | Baccichet | H04L 65/65 |
| | | | 709/219 |
| 2015/0350277 A1* | 12/2015 | Voris | H04N 21/2402 |
| | | | 709/219 |
| 2015/0381690 A1* | 12/2015 | Schmidt | H04N 21/2343 |
| | | | 709/231 |
| 2016/0205164 A1* | 7/2016 | Schmidt | H04L 65/70 |
| | | | 709/219 |
| 2016/0248474 A1* | 8/2016 | Gilson | H04N 21/2401 |
| 2017/0127101 A1* | 5/2017 | Rasool | H04N 21/8456 |
| 2017/0200454 A1* | 7/2017 | Srinivasan | G10L 19/167 |
| 2017/0359609 A1* | 12/2017 | Schmidt | H04N 21/2662 |
| 2018/0020035 A1* | 1/2018 | Boggia | H04L 43/0882 |
| 2018/0288452 A1* | 10/2018 | Le Garjan | H04N 21/24 |
| 2018/0302660 A1* | 10/2018 | Olechowski | H04L 65/80 |
| 2018/0352305 A1* | 12/2018 | Bowen | H04L 65/70 |
| 2019/0036823 A1* | 1/2019 | Voris | H04L 47/10 |
| 2019/0364330 A1* | 11/2019 | Moroney | H04N 21/26613 |

OTHER PUBLICATIONS

K. Keunsee, et al., "Server side, play buffer based quality control for adaptive media streaming", Multimedia Tools and Applications, Kluwer Academic Pulishets, vol. 75, No. 10, Mar. 4, 2015, pp. 5397-5415.

* cited by examiner

REDUCTION OF STARTUP TIME IN REMOTE HLS

CROSS REFERENCE TO RELATED APPLICATION

This Application is a continuation of U.S. patent application Ser. No. 15/621,467 filed Jun. 13, 2017, which claims priority under 35 U.S.C. § 119(e) from earlier filed U.S. Provisional Application Ser. No. 62/349,623 filed on Jun. 13, 2016 and incorporated herein by reference in its entirety.

BACKGROUND

Technical Field

The present invention relates to transcoding of streaming video using the HTTP Live Streaming (HLS) protocol. More specifically, the present invention relates to transmission of transcoded HLS chunks to enable startup of the video with limited buffer delays.

Related Art

Conventional Set Top Boxes (STB) can provide delivery of transcoded Digital Video Recorder (DVR) content to tablets and phones remotely over the Internet using the HTTP Live Streaming (HLS) protocol. The STB transcodes the DVR content in real-time at the tablet or phone client's request but at bitrates that conform to the available channel bandwidth of the client. All of the content cannot be transcoded ahead of time or faster than real-time. Playback begins at the client once transcoding of initial chunks is done, and the timing for this is based on the channel characteristics and how quickly the client can receive, buffer and begin playback the HLS chunks. As a consequence of real-time transcoding and the buffer management that client tablets and phones incorporate, it can take multiple seconds for the playback to begin. For example, an Apple iOS client typically waits until it has downloaded at least 2 secs of content and sees that at least 2 seconds more have been created and advertised by the server before it will begin playback, resulting in a minimum 4 second play startup time. This also allows for only a minimum 2 second Audio/Visual (A/V) buffer in the client to handle network variations.

It is desirable to have a larger buffer of A/V content in the client before playback begins in order to allow continued playback when channel conditions degrade and chunk downloads slow down. This can be accomplished by using longer chunk durations such as 3 or 4 secs. However, due to the iOS startup conditions described above, this lengthens the minimum startup of playback on the client to 6 to 8 secs, respectively. It is desirable to decrease the startup time for better user experience while allowing for larger network buffering.

SUMMARY

Embodiments of the present invention provide for a decreased startup time for remote HLS playback by pre-transcoding a number of HLS chunks for every DVR video asset recorded on the DVR and then serving some number of these pre-transcoded chunks immediately when the remote HLS client makes a request for that video asset. During this startup time, the transcoder is configured to begin real-time transcoding at a later position in the video asset that allows for seamless transition from the initial pre-transcoded chunks provided to the player.

Embodiments of the present invention provide a method for streaming transcoded HLS video to allow a minimum startup delay time. The method includes pre-transcoding a first number of the HLS chunks to allow transmission beginning at least at a first low bitrate. Then, once a request is received from a remote HLS client for the HLS video asset, transmitting a number of the pre-transcoded chunks to the remote HLS player. The pre-transcoded chunks are transmitted during a startup time until real-time transcoded chunks can be received and processed by the remote HLS player at a time position to allow seamless transition from the pre-transcoded chunks provided to the remote HLS player.

In some embodiments, the chunks needed to initialize the player can be created in the background when the DVR has a spare transcoder available. Current DVRs can have up to four real-time simultaneous transcoders. Background pre-transcoded startup chunks can be prepared for transmission at a second or third higher bitrate to allow the DVR to send increasing bitrate chunks at higher video quality if it determines the channel bandwidth supports it.

In other embodiments, the bitrate of pre-transcoded chunks are ramped up for a smooth transition to the channel bandwidth. A current adaptive bitrate transcoding algorithm in a DVR starts up at a low bit rate, e.g., 300 kbps, since the channel bandwidth is unknown, and ramps up the video bitrate to support channel bandwidths of increasingly higher bitrates. For embodiments of the present invention, a similar startup bitrate that ramps up can be used for the pre-transcoded chunks to allow a receiving HLS player to download the chunks more efficiently to reach a maximum bitrate over the remote Internet connection.

A further embodiment of the present invention entails transcoding each DVR asset's startup chunks from any bookmarked timestamp that the client has created rather than just at the beginning of the video asset. The client can create the timestamps in partial playback sessions. The timestamps allow the client to start from the bookmark position and achieve shorter playback starts with better blending from pre-transcoded chunks than currently encountered.

BRIEF DESCRIPTION OF THE DRAWINGS

Further details of the present invention are explained with the help of the attached drawings in which.

DETAILED DESCRIPTION

Figure 1:
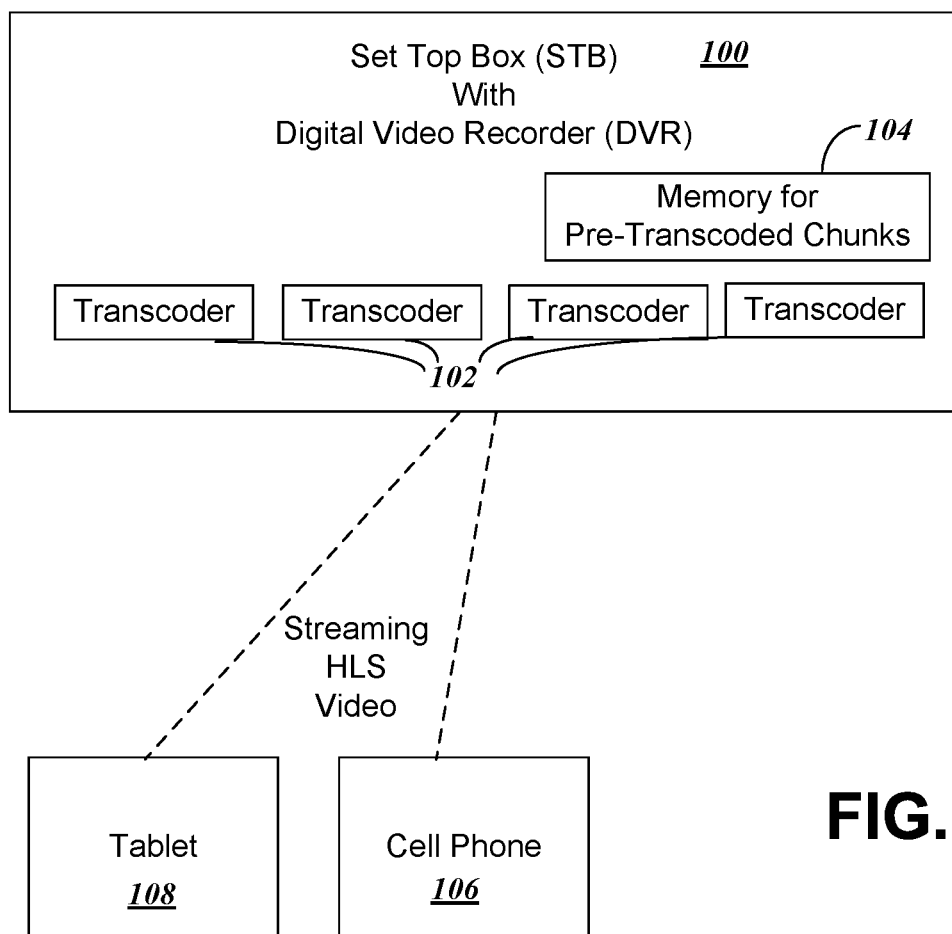
FIG. 1 is a block diagram of a system for implementing embodiments of the present invention, including a DVR with transcoders that transmit streaming HLS chunks for video assets to components like tablets and cell phones.

FIG. 1 is a block diagram of a system for implementing embodiments of the present invention. The system includes a set top box (STB) that includes a DVR 100. The STB and DVR 100 has the capability of streaming the recorded video assets of the DVR. The video assets are transcoded in transcoders 102 in the DVR 100 and streamed in HLS chunks to external devices such as a cell phone 106 or a tablet 108. The DVR can include four or more transcoders 102 that can act independently to each transcode video from a different video asset, or act together to transcode video from a single asset.

Embodiments of the present invention provide for pre-transcoding a number of chunks of a video asset using the transcoders 102 to enable more efficient startup of playback of a video asset. The pre-transcoding can be performed for each video asset and stored in memory 104. The transcoders 102 can pre-transcode video for transmission at several different rates, or at rates that can be ramped up to make a smooth transition from pre-transcoded video chunks to real time transcoded chunks for the remainder of the video asset that are transmitted to devices such as cell phone 106 or tablet 108.

Although not specifically shown, the STB 100 further includes at least one processor and at least one memory for storing code that is executable by the processor to enable the STB 100 to perform processes according to embodiments of the present invention that are described subsequently. The STB 100 further includes an interface for transmission of the streaming HLS video assets, and the memory further stores code to enable the processor to control the interface to enable such transmission as well as to control the transcoders 102 and storage of pre-transcoded video in memory 104.

Figure 2:
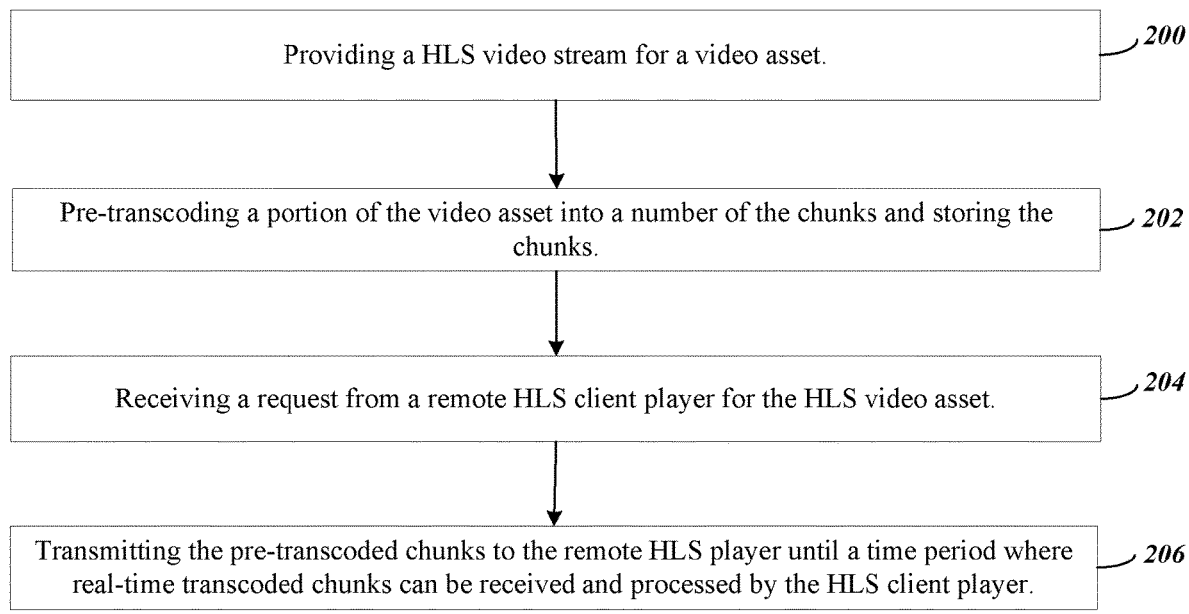
FIG. 2 shows a flow chart for a method of pre-transcoding a number of HLS chunks for a streaming video asset that are transmitted at start up to allow a seamless transition to real-time transcoded chunks according to embodiments of the present invention.

FIG. 2 shows a flow chart for one embodiment of pre-transcoding a number of HLS chunks for a streaming video asset that are transmitted at start up to allow a seamless transition from pre-transcoded chunks to real-time transcoded chunks. To start in step 200 a portion of the DVR recorded source video asset is read from memory and provided as input to a transcoder or multiple transcoders. In a subsequent step 202, one or more of the transcoders 102 are used to pre-transcode the portion of the DVR asset to a number of the chunks. The pre-transcoded chunks are then stored back on the DVR and associated with the original source DVR asset This pre-transcoding operation can be performed when transcoder resources are available, for example, not currently being used for live streaming sessions for mobile streaming clients.

In a next step 204 a request for the video asset is received from a remote HLS client player, such as the cell phone 106 or tablet 108. In step 206 at least a portion of the pre-transcoded chunks are transmitted to the HLS client player in response to the request. The pre-transcoded chunks are transmitted during a startup procedure until a period where real-time transcoded chunks making up the remainder of the asset can be received and processed by the HLS client player. In step 206, all of the pre-transcoded chunks can be transmitted, or a number of chunks less than all of the pre-transcoded chunks can be transmitted before the real-time transcoded chunks are transmitted to enable a smooth transition to the real-time transcoded chunks. With a higher bandwidth of the receiving device, all of the pre-transcoded chunks might be transmitted, while with a lower bandwidth only a portion of the pre-transcoded chunks will be needed before transition to the real-time transcoded chunks.

Figure 3:
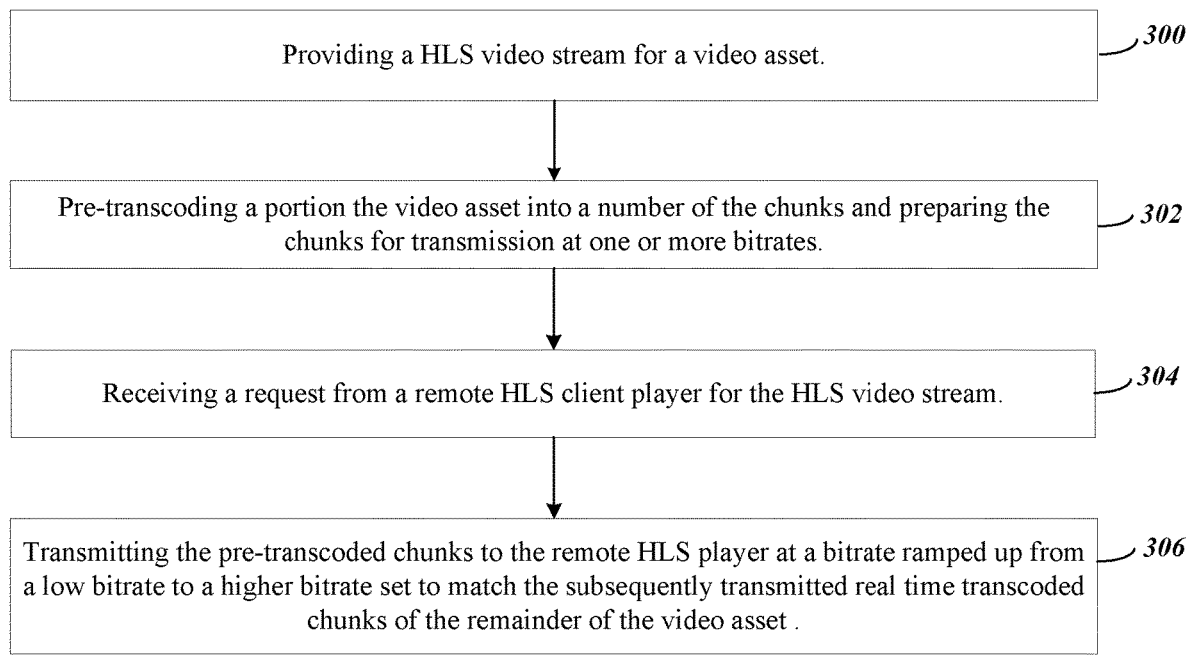
FIG. 3 shows a flow chart illustrating an alternative embodiment with ramping up of a pre-transcoding bitrate from a low bitrate to a high bitrate for a better smooth transition to the channel bandwidth.

FIG. 3 shows an alternative to the embodiment of FIG. 2, with the transmission bitrate of the pre-transcoded chunks ramping up from a low bitrate to a high bitrate for a better smooth transmission to the channel bandwidth for the receiving device. As with the method of FIG. 2, FIG. 3 begins with the step 300 of providing an HLS video asset for streaming that is subsequently pre-transcoded and divided into chunks.

FIG. 3 differs from the method of FIG. 2 beginning in step 302. Step 302 differs by using the transcoders to pre-transcode the portion of the DVR source video asset into chunks for transmission at more than one bitrate. In one embodiment chunks can be pre-transcoded for transmission at a predetermined number of bitrates, such as two or three. The chunks can also be pre-transcoded for transmission at a continuously variable bitrate that ramps up from an initial low bitrate to a higher bitrate that matches the channel bitrate of the receiving device. Alternatively, the pre-transcoded chunks can be transmitted and ramped up in bitrate to a rate just below the maximum channel bitrate, where the final channel bitrate will then be provided for the real-time transcoded chunks that are subsequently transmitted.

The channel bitrate or equivalently, the available channel bandwidth, can be measured by the STB server during the client's download of the first and following pre-transcoded chunks or it can be provided from the receiving device after transmission of some of the pre-transcoded chunks. Alternatively, the channel bitrate for the receiving device can be known in advance at the transmitting STB. Because the receiving bitrate of the receiving device may not be identified until after startup transmission of the pre-transcoded chunks, the variable rate beginning with a low bitrate will enable the transmission bitrate to not surpass the bitrate of receiving device.

In a next step 304 a request for the asset is received from a remote HLS client player, such as the cell phone 106 or tablet 108. In step 306 at least a portion of the pre-transcoded chunks are transmitted to the HLS client player in response to the request. As indicated with respect to step 302, the pre-transcoded chunks are transmitted to the remote HLS player at a bitrate ramped up from initial low bitrate to a higher bitrate. The high bitrate can be set to a value just below the maximum channel bitrate for the receiving asset. Alternatively, the high bitrate can be set to match the maximum channel bitrate. The bitrate may be ramped up in steps, or ramped up continuously. In step 306, the real-time transcoded chunks are subsequently transmitted to the requesting HLS player, allowing a smooth transition from the pre-transcoded chunks for the remainder of the video asset.

Figure 4:
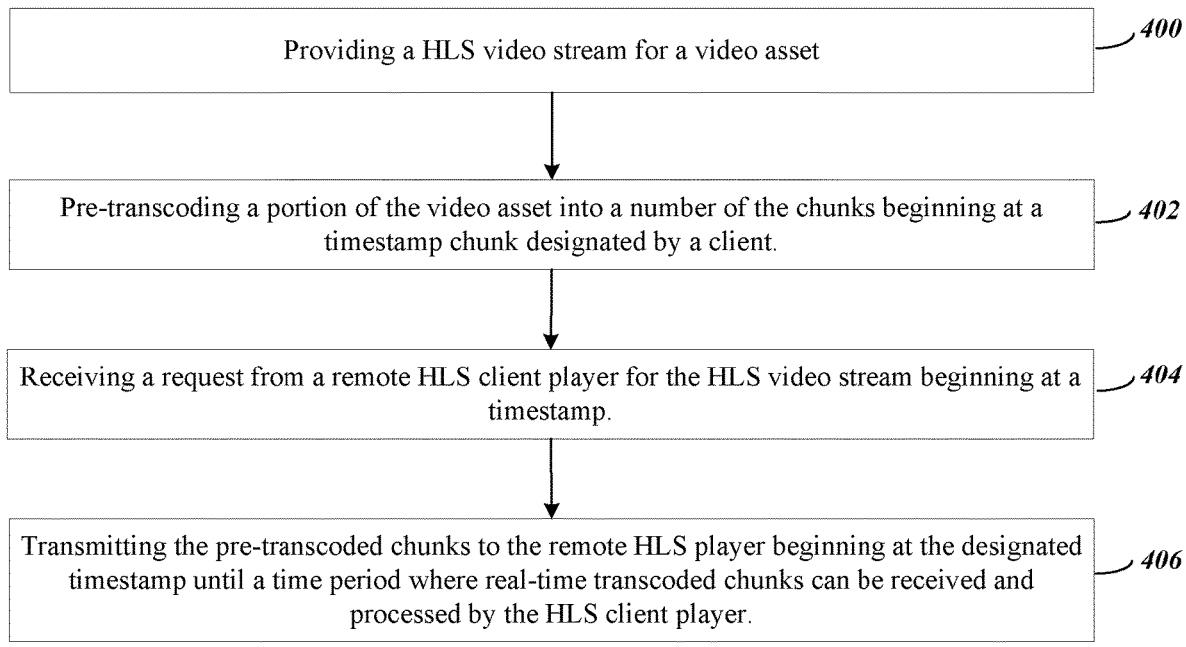
FIG. 4 shows a flow chart illustrating designated timestamps provided in the video asset where pre-transcoding of chunks can occur other than at the beginning of the asset.

FIG. 4 provides a flow chart illustrating another alternative embodiment of the present invention differing from FIGS. 2 and 3 where designated timestamps are provided in the video asset where pre-transcoding of chunks can occur other than at the beginning of the asset. As with the method of FIGS. 2 and 3, FIG. 4 begins with the step 400 of providing an HLS video asset for streaming that is divided into chunks.

FIG. 4 differs beginning at step 402. Step 402 differs by providing one or more timestamps at a point in the chunks allowing pre-transcoding to begin at the timestamps. With a timestamp, a designated portion of the video can be transcoded rather than starting transcoding from the beginning. The one or more timestamps can be included in the video asset by the DVR upon recording to enable transcoding only of designated segments. The timestamps can alternatively be designated at one or more points in the video asset by the requesting video player.

In a next step 404 a request for the asset chunks beginning at a timestamp is received from a remote HLS client player. In step 406 the pre-transcoded chunks are transmitted to the HLS client player beginning at the timestamp in response to the request. The real-time transcoded chunks are subsequently transmitted to the requesting HLS player, allowing a smooth transition from the pre-transcoded chunks.

In one example, an iOS Server and an HLS Player are provided and the server provides to the HLS Player a live, sliding-window manifest that initially contains 3 segments. The player will download all 3 segments as fast as the network supports and begins playback after at least 2 seconds of content has been successfully downloaded, given the network bandwidth is higher than the chunk bitrate by a scale factor of typically 3×. The player will then request the next manifest at the HLS target duration which can be set to the chunk duration in seconds.

So for example, it is expected that a conventional sliding-window manifest advertising three chunks, e.g., 2 second chunks at 300 kbps over a network that supports approximately 900 kbps bandwidth, could allow a startup time of just (300 kbps/900 kbps)×2 sec=667 msecs. The download of all 3 chunks would require 2 secs and in that time the player would acquire 6 secs of content and have been playing for 1.33 secs to have a buffer of 4.67 seconds that would reach a minimum of 4.67−2 seconds over the next live chunk production duration. Conversely, the implementation of the present invention embodiments of advertising each chunk as it is produced in real-time would have a minimum startup time of 4 seconds (2 chunks available with one fully downloaded) while building a buffer of minimum 2 seconds in depth. So the benefits of the method according to embodiments of the present invention are shorter startup but with potentially larger buffers.

In another example for the reduction of startup time for remote HLS, the method described for embodiments of the present invention is accomplished by the following five steps.

In a first step 1, for every DVR asset on the STB, the STB will pre-transcode $T_{startup}$ seconds from the start and/or bookmarked position of the content to a low video bitrate and resolution, e.g., 236 kbps AVC at 384×216 plus HE-AAC stereo audio at 64 kbps. Additionally, the STB will pre-transcode the same $T_{startup}$ seconds of content to higher video bitrates, e.g., 448×232 at 336 kbps, 512×288 at 436 kbps, etc. when background CPU/transcoder resources and disk space permit. For each transcoded asset, the STB will save transcoder state metadata to facilitate the restarting of any future live transcode session at the point $T_{startup}$ seconds into the source file in a seamless or near seamless manner.

In a second step 2, the STB will create HLS chunk files of duration $T_{chunk}$ seconds from the $T_{startup}$ seconds of transcoded content.

In a third step 3, When an asset is requested by a remote HLS client, the STB server will create a manifest consisting of N chunks created from the $T_{startup}$ seconds of content at the lowest bitrate. N might typically be 3 and $T_{chunk}$ could typically be 2 or 3 seconds. The transcoder of the STB will be reconfigured to start transcoding the remainder of the asset in real-time from $T_{startup}$ position using the stored state metadata.

In a fourth step 4, the as the player downloads the N chunks, the server measures the download bandwidth achieved and may advertise, at the next HLS target duration interval, a manifest with a new chunk at a higher bitrate from the $T_{startup}$ seconds of pre-transcoded content, if the bandwidth will support it.

In a fifth step 5, when the $T_{startup}$ duration has been achieved, the live transcoded output begins to be accumulated for creation of future chunks. The last bandwidth measured by the server to the player is used to dynamically configure the live transcoder video bitrate. New chunks will be created from the real-time transcoder output operating on the remainder of the STB DVR content.

In summary, the embodiments of the present invention provide a significant time savings for startup of streaming HLS video. The current (prior) solution to remote HLS startup entailed transcoding the content in real-time from the desired start location (bookmark or start of asset) and creating and advertising a manifest with one chunk when the first chunk had been created. Typically, the time to startup up the transcoder and produce the first chunk was longer than $T_{chunk}$ by a few hundred milliseconds. To create a second chunk required exactly $T_{chunk}$ seconds. The total startup time in this prior solution exceeded the chunk duration by hundreds of milliseconds. Embodiments of the present invention will reduce that startup contingent on the network bandwidth available to the client.

Although the present invention has been described above with particularity, this was merely to teach one of ordinary skill in the art how to make and use the invention. Many additional modifications will fall within the scope of the invention as that scope is defined by the following claims.

What is claimed:

1. A method of streaming video comprising:
providing a portion of a recorded video asset to a transcoder or transcoders;
storing pre-transcoded portions of a video asset as a sequence of temporally contiguous chunks, where the chunks sequentially increase in bitrate;
receiving a request from a remote HTTP Live Streaming (HLS) client player for the recorded video asset at a determined bitrate; and
transmitting the chunks to the remote HLS client player in sequence and at a bitrate no greater than the determined bitrate for a period of time, the magnitude of the period based on the determined bitrate, and thereafter transmitting chunks to the remote HLS client player transcoded in real time at the determined bitrate.

2. The method of claim 1 further comprising:
transmitting at least a first one of the pre-transcoded chunks at said first low bitrate;
measuring a bandwidth available to the remote HLS player; and
transmitting subsequent ones of the pre-transcoded chunks at the multiple increasing bitrates for a remainder of the period of time.

3. The method of claim 2, wherein the pre-transcoded portion includes a highest bitrate chosen to be less than an available bandwidth receivable by the remote player by a predetermined margin.

4. The method of claim 2, wherein the pre-transcoded portion includes a highest bitrate equal to the bandwidth of the remote player.

5. The method of claim 2, wherein the pre-transcoded portion includes two or more higher bitrates.

6. The method of claim 2, wherein the pre-transcoding of the chunks begins at a bookmarked timestamp.

7. The method of claim 1, further comprising during a startup time when the pre-transcoded chunks are transmitted, beginning transcoding and transmission of the remaining chunks at a time position to allow seamless transition from the pre-transcoded chunks provided to the remote HLS player.

8. The method of claim 7,
wherein the pre-transcoded chunks include a first number of chunks of the video asset, and the chunks transcoded in real-time include chunks after the first number of chunks of the video asset,
wherein real-time transcoding begins at the time of transmission of the pre-transcoded chunks, and
wherein the transmission of the chunks transcoded in real-time begins after a predetermined number of pre-transcoded chunks are transmitted.

9. The method of claim 8, wherein all of the first number of pre-transcoded chunks are transmitted before the chunks transcoded in real-time chunks are transmitted.

10. The method of claim 8, wherein not all of the first number of pre-transcoded chunks are transmitted before the chunks transcoded in real-time chunks are transmitted.

11. An apparatus for streaming HTTP Live Streaming (HLS) video to at least one remote HLS player device, the apparatus comprising:
an interface for transmitting the streaming HLS video to the remote HLS player;
a memory storing a portion of a recorded video asset divided and pre-transcoded into a number of temporally contiguous chunks, where the chunks sequentially increase in bitrate;
a processor connected to control the interface and configured to receive the streaming HLS video and receive the pre-transcoded contiguous chunks, and:
receive a request from the remote HLS client through the interface for the recorded video asset at a determined bitrate; and
transmit the stored pre-transcoded chunks to the remote HLS through the interface at a bitrate no greater than the determined bitrate for a period of time, the magnitude of the period based on the determined bitrate, and thereafter transmitting chunks transcoded in real time at the determined bitrate.

12. The apparatus of claim 11, where the processor is configured to:
transmit at least a first one of the pre-transcoded chunks through the interface at said first low bitrate;
measure a bandwidth available to the remote HLS player; and
transmit subsequent ones of the pre-transcoded chunks through the interface the multiple increasing bitrates for a remainder of the period of time.

13. The apparatus of claim 12, wherein the memory stores processor executable code to cause the processor during a startup time when the pre-transcoded chunks are transmitted, to begin transcoding and transmission of the remaining chunks through the interface at a time position to allow seamless transition from the pre-transcoded chunks provided to the remote HLS player.

14. The apparatus of claim 13,
wherein the pre-transcoded chunks include a first number of chunks of the video asset, and the chunks transcoded in real-time include chunks after the first number of chunks of the video asset,
wherein the chunks transcoded in real-time begins at the time of transmission of the pre-transcoded chunks, and
wherein the transmission of the chunks transcoded in real-time begins after a predetermined number of pre-transcoded chunks are transmitted.

* * * * *